A. E. HODGSON.
SEAT AND BODY OF MOTOR CARS AND OTHER ROAD CARRIAGES.
APPLICATION FILED JAN. 22, 1907.

991,307.

Patented May 2, 1911.

2 SHEETS—SHEET 1.

Witnesses.

Inventor
Albert Edward Hodgson
by Henry Connett
Attorney

A. E. HODGSON.
SEAT AND BODY OF MOTOR CARS AND OTHER ROAD CARRIAGES.
APPLICATION FILED JAN. 22, 1907.

991,307.

Patented May 2, 1911.

2 SHEETS—SHEET 2.

Witnesses.

Inventor:
Albert Edward Hodgson
by Henry Connett
Attorney

UNITED STATES PATENT OFFICE.

ALBERT EDWARD HODGSON, OF WALTHAMSTOW, ENGLAND, ASSIGNOR TO THE "RELYANTE" MOTOR WORKS, OF WALTHAMSTOW, ENGLAND.

SEAT AND BODY OF MOTOR-CARS AND OTHER ROAD-CARRIAGES.

991,307.  Specification of Letters Patent.  Patented May 2, 1911.

Application filed January 22, 1907. Serial No. 353,543.

*To all whom it may concern:*

Be it known that I, ALBERT EDWARD HODGSON, a subject of the King of Great Britain, and residing at The "Relyante" Motor Works, of Blackhorse Road, Walthamstow, in the county of Essex, England, have invented certain new and useful Improvements in Seats and Bodies of Motor-Cars and other Road-Carriages, of which the following is a specification.

This invention relates, more especially, to seats and bodies for motor cars, but is also applicable to horse carriages or carriages generally.

In motor and other carriages as heretofore constructed, the seats, in the inclosed part of the vehicle or in the body portion which is usually behind the driver's seat, when placed face to face have the disadvantage that the knees and feet of the persons seated upon the one seat are inconvenienced by those of the persons sitting on the opposite seat; and this invention has for its main object to arrange and construct in an improved manner the inside front seat or seats.

According to this invention, the front seat or seats of the inclosed part of the carriage body is or are made to face forward, as has already been previously proposed, but is or are in the form of chairs having front and rear legs and are constructed to be capable of folding up when not required, and when persons are about to enter or leave by the door of the inclosed part of the vehicle; and, further, according to this invention the front chair seat or each such seat is formed with a back which is rigid with the rear legs and is adapted to be turned back to join the back seat, and thus form a couch conjointly with the back seat and seat proper of the front chair seat, no novelty being claimed, however, broadly for the utilization of the back of a front seat in the formation of a couch.

In order that the invention may be clearly understood, we will proceed to describe, by way of example, a practical application of the same with reference to the drawings herewith, of which:—

Figure 1:
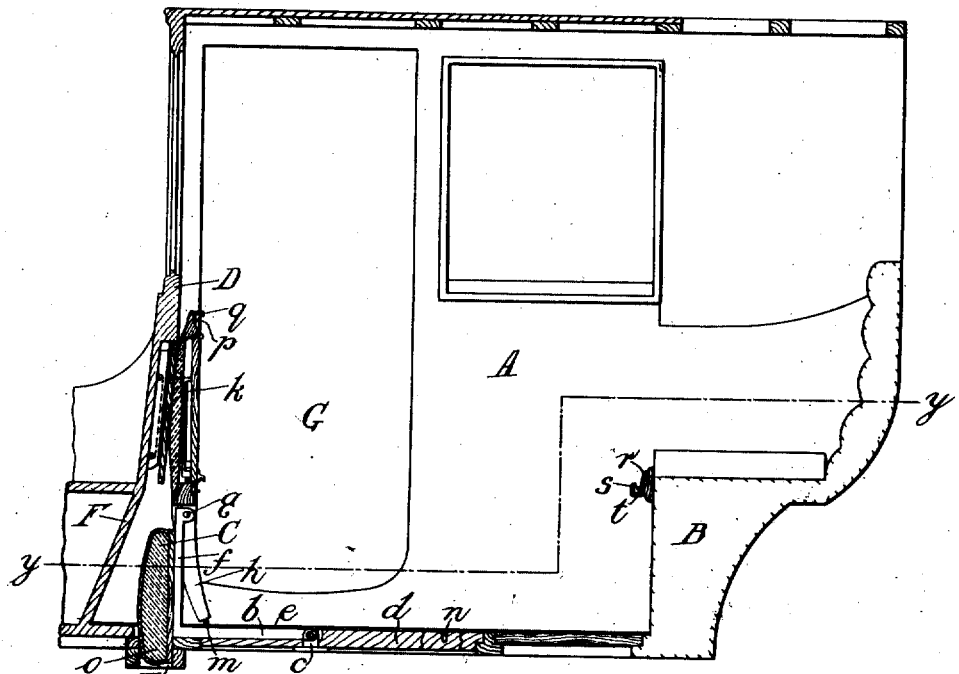
Figure 2:
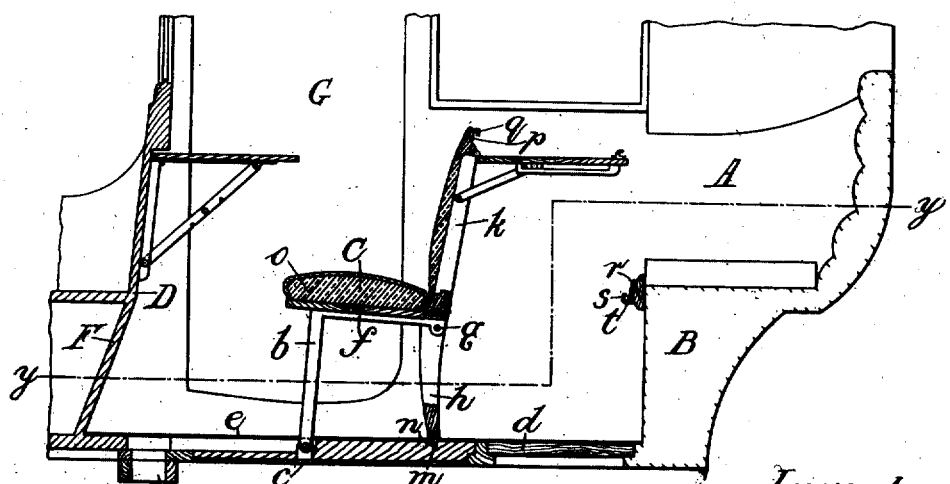
Figure 3:
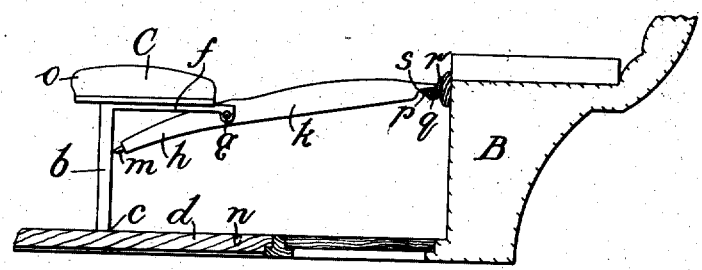
Figure 4:
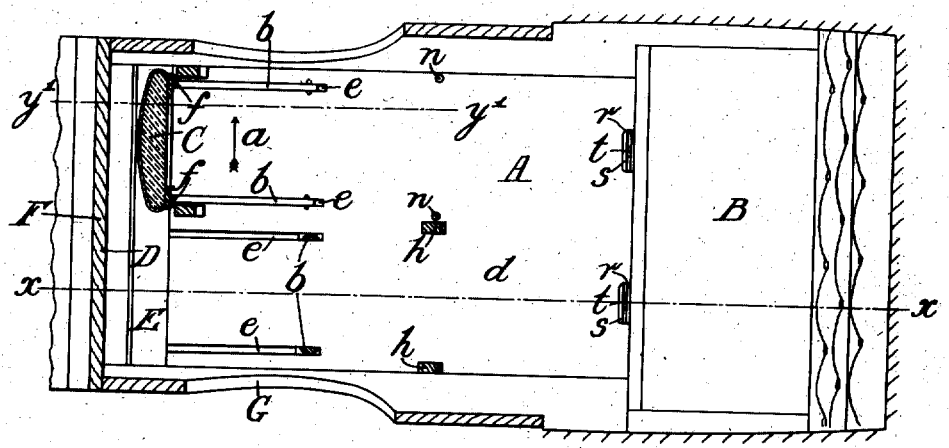
Figure 6:
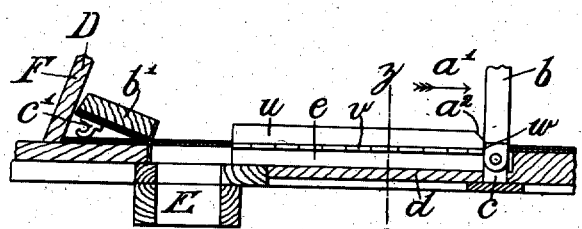
Figure 7:
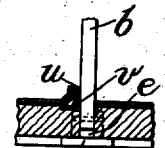
Figure 8:
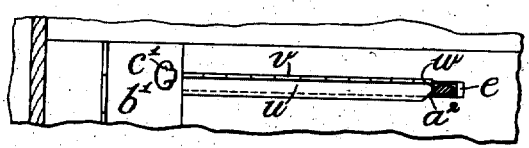
Figure 5:
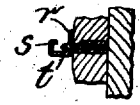

Figure 1 is a longitudinal section of a motor car body constructed according to this invention, the section being taken in the plane indicated by line $x$ $x$ of Fig. 4 looking in the direction of the arrow $a$ and showing one of the front chair seats in its folded up or out-of-use position. Fig. 2 is a view corresponding to Fig. 1, but showing the front chair seat in its in-use position and showing also tables hereinafter described, attached to the front of the motor car body and to the back of the front seat, respectively, in their unfolded or in-use positions. Fig. 3 is a somewhat diagrammatic view, showing the front chair seat in position for use as a couch. Fig. 4 is a sectional plan of the car body the section being taken along the irregular line $y$ $y$ of Figs. 1 and 2. Fig. 5 is a section, to an enlarged scale, showing means by which the back of the chair seat is attached to the back seat when the chair seat is being used in combination with the back seat to form a couch. Fig. 6 is a sectional view, to the same scale as Fig. 5, taken in the plane indicated by line $y'$ $y'$ of Fig. 4 illustrating a modification of the invention in which covers are used both in connection with the slots in which the legs of the front chair seats lie, when such seats are out of use, and also with the recess hereinafter described, which is provided to receive a portion of each front seat. Fig. 7 is a section taken on line $z$ $z$ of Fig. 6 looking in the direction of the arrow $a'$; and, Fig. 8 is a plan view of such modification.

Referring now to Figs. 1 to 5 inclusive of the drawings herewith, A is a motor car body of the brougham type having a back seat B adapted to seat two or more persons and two front chair seats C side by side, adapted to fold up when out of use, against the front D of the car body. Each front chair seat C has two front legs $b$ which are each pivoted to a bracket $c$ secured to the floor $d$ of the car body, and are adapted to be turned down forward until they lie within slots $e$ formed in the floor in a manner similar to that which has been previously proposed. Each leg $b$ is formed in one piece with a bearer $f$ which is rigidly attached to the underside of the front seat proper, as has also been previously proposed, but each bearer has a pivot center $g$ at its rear end formed backward of the seat proper and somewhat below the level thereof, when the seat proper is in its in-use position, to which the hind legs $h$ of the chair seat and the back $k$, which is formed in one piece with the back legs, are pivoted.

Small projections or studs $m$ are formed at the bottoms of the hind legs which are adapted to take into corresponding holes $n$ formed in the floor $d$ so as to insure rigidity when the front chair seat is in its in-use position. A recess E is formed, conveniently right across the floor of the car body, close or near to the front thereof, in order to receive the forwardly projecting portion $o$ of the seat proper when the latter is in its folded up or out-of-use position.

When the front chair seats are in their in-use position, the projections $m$ on the back legs are in the holes $n$ in the floor, as clearly shown by Fig. 2, and in order to turn the seats into their folded up or out-of-use position, it is simply necessary in the case of each chair, to lift the back to clear the projections $m$ from the holes $n$, turn the back of the seat backward until it is substantially in line with the seat proper, and then turn the whole chair forward, on the pivot axis $c$, until it lies out of the way of passengers right up against the front of the car body, as clearly shown by Fig. 1, while the front legs are down in the slots clear of the feet of the passengers.

When it is desired to utilize either of the front chair seats, in conjunction with the back seat B, as a couch, a hook-like attachment $p$ such as has been previously proposed for a similar purpose but having a lip $q$, is attached to the upper part of the back of the front chair seat, and attachments $r$ are formed on the back seat B, adapted to engage each with the corresponding attachment on the back of the respective front chair seat. One of the attachments $r$ is clearly shown in Fig. 5. This is also formed hook-shaped, having a lip $s$ and also a spring pressed tongue $t$ which serves to press the lip $q$ of the chair back underneath the lip $s$ so that after the attachment $p$ has been engaged with the attachment $r$ it cannot be disengaged therefrom inadvertently. It has been found in practice, however, that the spring pressed tongue $t$ can be dispensed with and the fittings modified so that the weight of the chair and back serve to keep the lip $q$ under the lip $s$.

To utilize a front chair seat as part of a couch as above stated, the back of the chair seat is raised to clear the projections $m$ from the holes $n$ as aforesaid, and the back then turned back-ward and its attachment $p$ engaged with the attachment $r$ on the back seat B. The distance between the front and back seat and the height of the back $k$ are such that when the chair back is in its couch position and weight is put thereupon, the attachment $p$ on the back of the chair seat bears back against the back part of the fitting $r$ as an abutment, and it will be seen that the pivot center $g$ cannot move downward as it is some distance above a line passing through the pivot center at $c$ and the attachment $r$ and thus a firm couch is formed. To release the chair back from its couch position it is simply necessary to press down upon the pivot center $g$ which insures that the lip $q$ will move backward and clear itself from the lip $s$ and then the back of the chair seat can be lifted up and placed in its seat position, or in its folded up position.

If desired, the fittings $q$ $r$ may be dispensed with and a ledge simply formed along the front of the back seat B just below the top thereof upon which the top edge of the back of each chair seat may rest, the top of the back of the chair seat, in this case, bearing back simply against the front of the back seat. If preferred, also, the chair seat may be made rigid in its couch position, by causing the chair seat proper to extend somewhat sidewise beyond the bearers $f$ and so designing the hind legs that a portion of them, at any rate, will bear up against such projecting sides when the front chair seat is in its couch position.

The front legs, may, of course, be rigidly attached to the chair seat proper in any desired manner, and the back and hind legs may also be pivoted to the seat proper in any way desired; but the construction with the bearers $f$ formed rigid with the front legs $b$ is greatly preferred.

Referring now to Figs. 6, 7 and 8 each slot $e$ above described is provided with a cover $u$ hinged at $v$ in order to preserve the continuity of the floor when the front chair seats are in either of their positions. When a front leg $b$ is raised from its slot $e$, it lifts the cover and the latter falls back again to close the slot after the leg has been raised. As the leg is turned down again, it automatically raises the cover $u$ on account of a slightly inclined portion $w$ at its foot coming against the sloped off edge $a^2$ of the cover $u$. The cover of course falls back to its place as soon as the leg is down in its slot. A cover $b'$ which may be opened and closed by hand by means of the handle $c'$ may be used to close the recess E when the front chair seats are in either of their in-use positions.

Instead of using the slots and covers for the front legs of the chair seats as above described, a board (covered conveniently with a piece of carpet) may be fitted between such legs so that it is vertical when the chair is in use, and the floor of the car may be recessed so that the board will come down flush with the floor of the car when the seat is turned down.

The doorway G at each side of the carriage is placed at the forward end of the body.

Folding tables of any suitable construction, such as shown in the drawings herewith, may be used in connection with the front of the car body and the backs of the front chair seats, for the use of persons seated on the front and back seats, respectively.

The lower part F of the front of the car body may be made to slope forward, as shown, so as to provide increased room for the feet of the passengers seated on the front chair seats. In lieu thereof, in cases in which the driver's seat is on a level with the carriage floor, apertures may be formed through the front of the carriage body therefor.

It will be seen that, when only so many passengers as can sit on the back seat desire to travel in the inclosed part of the body, the chair seats, being made to fold up as before mentioned, can be conveniently moved right out of the way up against the front of the inclosed part of the body, thus leaving the floor space clear and adding greatly to the comfort of the passengers; while, on the other hand, when the chair seats are in use, the passengers who occupy the back seat and those who occupy the chair seats also, have much more leg room than can be obtained with the passengers seated facing each other, as in the case of motor car bodies or horse carriages of the usual construction or design.

I have described the invention as applied to a motor brougham, but it will be seen that the invention is equally applicable to carriages generally, whether horse drawn or of the motor driven type.

Having fully described my invention what I claim and desire to secure by Letters Patent, is:—

1. A front seat formed as a chair with a front support pivoted to the floor of the compartment and adapted to rigidly support the front edge of the seat proper, a hind support pivoted to the seat proper and a back formed rigid with the hind support.

2. A front seat formed as a chair with a front support pivoted to the floor of the compartment and adapted to rigidly support the front edge of the seat proper, a hind support pivoted to the seat proper and a back formed rigid with the hind support, said back being adapted for engagement with the back seat so that the front seat may be either folded down against the front of the vehicle set up for use as a chair, or have its back turned back to form a couch in conjunction with the back seat, the hind support in the latter case lying either just below or in line with the seat proper.

In witness whereof I have hereunto signed my name this first day of January, 1907, in the presence of two subscribing witnesses.

ALBERT EDWARD HODGSON.

Witnesses:
ALFRED H. WATKINS,
FREDK. L. RAND.